Oct. 25, 1932.  E. W. RIEMENSCHNEIDER  1,884,247
POLE BASE
Filed June 2, 1928  2 Sheets-Sheet 1

Inventor
E. W. Riemenschneider
By Harry Frease
Attorney

Patented Oct. 25, 1932

1,884,247

UNITED STATES PATENT OFFICE

EDMUND W. RIEMENSCHNEIDER, OF CANTON, OHIO, ASSIGNOR TO THE UNION METAL MANUFACTURING COMPANY, OF CANTON, OHIO, A CORPORATION OF OHIO

POLE BASE

Application filed June 2, 1928. Serial No. 282,320.

The invention relates to bases for tubular poles and more particularly to a hollow base adapted to be mounted above the surface of the ground and to have superimposed thereon the ordinary form of base upon which a pole carrying electrical equipment or the like is supported, the lower hollow base to which the invention pertains being adapted to house a transformer or other electrical equipment.

In the installation of tubular lighting standards and the like, it is necessary to provide a transformer or other electrical equipment, and the proper housing of such electrical equipment has for years been one of the greatest problems with which the manufacturers of such lighting standards and the like have had to contend.

The placing of the electrical equipment underground is objectionable not only because of the moisture to which the equipment is subjected but because of the inaccessibility of the equipment in such a location.

For this reason, it is desirable to house the transformer or the like within the base which supports the pole or shaft.

It is known that in the past hollow bases have been produced in which such electrical equipment may be housed but in such former constructions it is customary to provide anchor bolts extending upward through the hollow base to the upper portion thereof in order to assemble the base upon the cement foundation and the pole upon the base.

Such structures place the base under compression at all times; obstruct the interior of the base, thus cutting down the available space for housing the electrical equipment; and are also objectionable as there is considerable stretch in these long bolts, when the pole is under strain due to side loading or due to impact, which permits the whole structure to become loosened and unstable and also allows the pole to lean or gives the pole an undesirable cant.

The object of the present improvement is to provide a hollow base of cast steel or the like having ears in its lower end for connection to the usual anchor bolts and provided with means at its upper end for supporting the usual base carrying a lamp standard, pole or the like, said upper base being connected to the upper end of the hollow lower base by short bolts or the like, whereby the stretch in the bolts is reduced to a minimum and the entire interior of the base is unobstructed in order to provide ample space for housing a transformer or the like.

Figure 1:
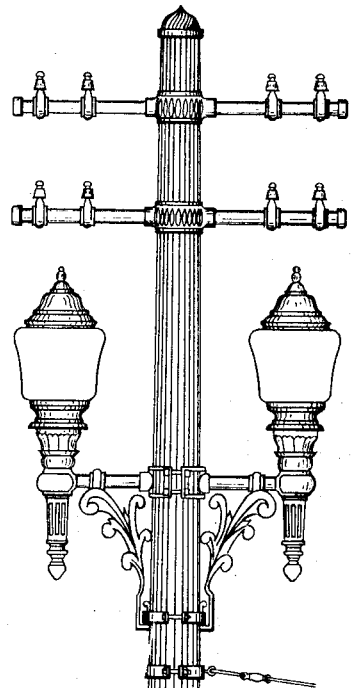
Figure 2:
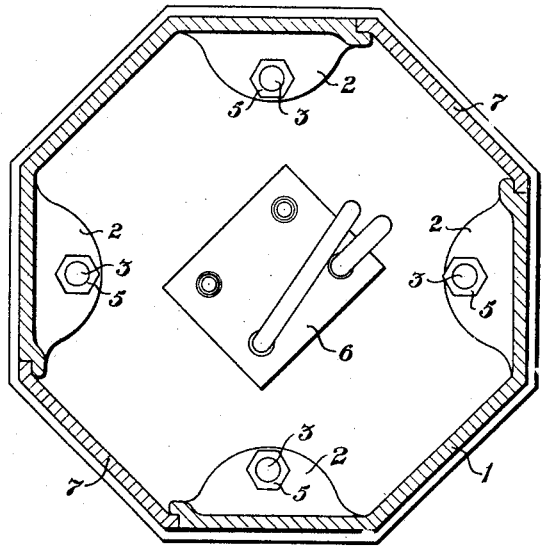
Figure 4:
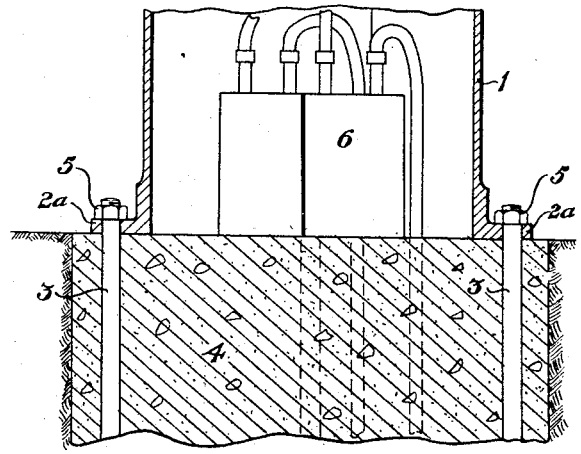
Figure 3:
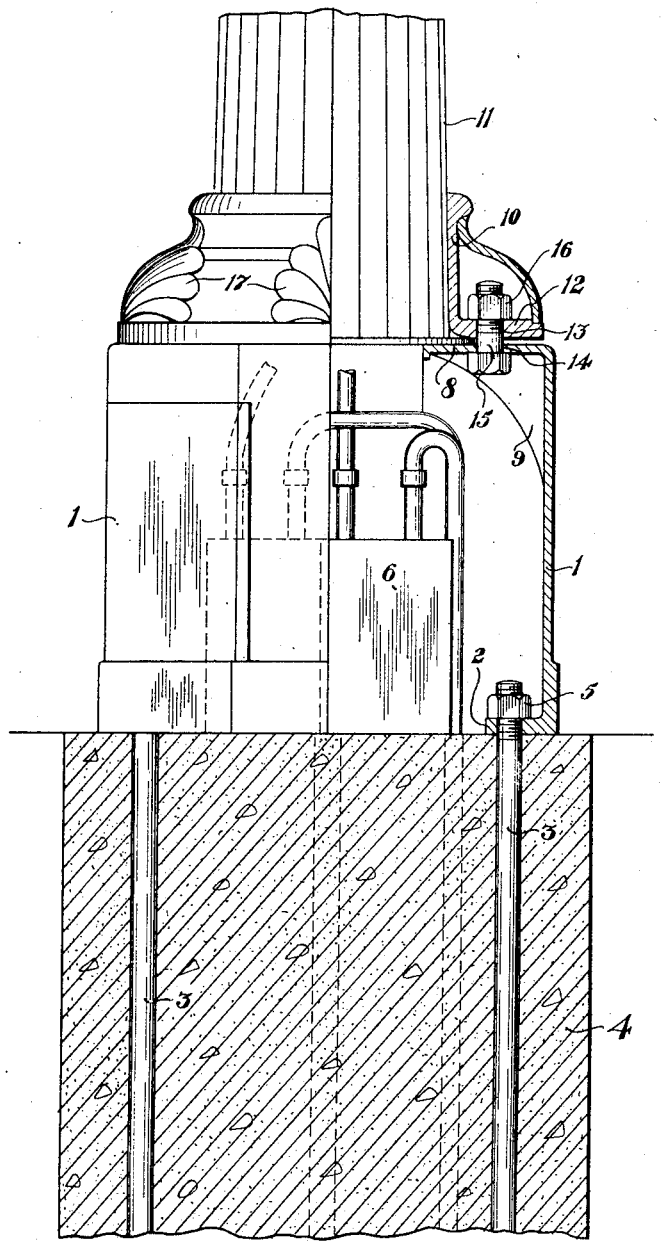

An embodiment of the invention is illustrated in the accompanying drawings, in which Figure 1 is a side elevation of a combination lamp standard and transmission pole supported upon the improved base;

Fig. 2, a transverse section through the improved base on the line 2—2, Fig. 1;

Fig. 3, a side elevation, partly in section of the improved base, showing the cement foundation and a portion of the pole and upper base therefor; and Fig. 4, a section through the lower portion of the improved base, showing the attaching ears outturned.

Similar numerals refer to similar parts throughout the drawings.

The improved base to which the invention pertains may be in the form of a hollow casting or the like indicated generally at 1, having integral ears 2 or 2a at its lower end turned horizontally inward or outward, respectively, as shown in Figs. 3 and 4 for connection to the upper ends of the anchor bolts 3 which are imbedded in the cement foundation 4 in customary manner, nuts 5 being provided upon the upper ends of said bolts to draw the ears down tightly against the foundation.

This base is hollow as illustrated and provides sufficient space to accommodate a transformer 6 or other electrical equipment. In order to provide access to the transformer, one or more doors 7 may be provided in the sides of the base, being of sufficient dimensions to permit the transformer to be entirely removed therethrough if necessary.

The upper end of the base is provided with the integral inturned horizontal flange 8 which may be braced as by the ribs 9, and adapted to receive and support the upper base 10, which is of ordinary construction, and the shaft or pole 11.

The upper base 10 is provided with the horizontal flange 12 having apertures 13 adapted to register with the apertures 14 in the flange 8 of the lower base.

Bolts 15 are passed through the apertures 13 and 14 and receive the nuts 16 by means of which the upper base, carrying the shaft or pole, is rigidly secured upon the top of the lower base.

The usual ornamental leaves or the like as shown at 17 may be provided upon the upper base to cover the bolts 15 and nuts 16 in order to give an ornamental appearance.

By constructing the base 1 in the manner above described, it will be seen that the lower end of the same is connected directly to the protruding ends of the anchor bolts, thus obviating any appreciable stretch of these anchor bolts.

In the same manner, the upper base 10, which carries the shaft or pole, is connected at its lower end to the upper end of the lower base 1, as by the short bolts 15, thus eliminating the possibility of any considerable stretch in these bolts and making a rigid construction.

The base as thus constructed of cast steel or the like provides ample room to house the electrical equipment and to permit access thereto and takes both compression and tension.

By securing the base to the foundation at its lower end and adjacent to its circumference, it will be seen that a more rigid structure is provided, thus reducing the leverage of the shaft in the event the same is struck, and this characteristic is increased by providing the ears 2a extending outward from the base.

It is understood that poles, not designed to carry transverse loading, have been placed upon cast iron boxes, but such construction was not adequate to carry transverse loading such as trolley span wires, transmission wires or the like, as such boxes were not constructed to take both the compression and tension or impact.

I claim:

In pole construction, a foundation disposed entirely below the level of the ground, anchor bolts embedded in the foundation and extending upwardly therefrom, a hollow base provided at its lower end with internal horizontally disposed perforate ears registering with said anchor bolts, nuts threaded on said anchor bolts to draw the ears down tightly against the foundation, an inwardly presented integral horizontally disposed flange at the upper end of said hollow base, a tubular pole subjected to transverse loading provided with a base having an outwardly presented horizontally disposed flange, and bolt means for attaching said horizontally disposed flanges together, whereby the transverse loads imposed upon the pole will be transmitted through said pole base, bolt means, hollow base, and anchor bolts to the foundation.

In testimony that I claim the above, I have hereunto subscribed my name.

EDMUND W. RIEMENSCHNEIDER.